(12) United States Patent
Charnesky et al.

(10) Patent No.: US 8,328,268 B2
(45) Date of Patent: Dec. 11, 2012

(54) SYSTEM FOR CONTROLLING AN ACCESS OPENING IN A BODY OF A VEHICLE

(75) Inventors: Scott P. Charnesky, Birmingham, MI (US); Jeffrey L. Konchan, Romeo, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 179 days.

(21) Appl. No.: 12/904,198

(22) Filed: Oct. 14, 2010

(65) Prior Publication Data
US 2012/0091749 A1 Apr. 19, 2012

(51) Int. Cl.
*B60J 10/08* (2006.01)
(52) U.S. Cl. ... 296/146.9; 49/316; 277/644; 292/DIG. 3
(58) Field of Classification Search .................. 49/306, 49/307, 308, 314, 316, 319, 320, 321, 366, 49/367, 368, 475.1, 477.1, 480.1, 500.1; 244/129.4, 129.5, 130, 131; 277/345, 644, 277/921; 292/307 R, DIG. 3; 296/146.9, 296/193.06, 202, 206
See application file for complete search history.

(56) References Cited

U.S. PATENT DOCUMENTS

| | | | | |
|---|---|---|---|---|
| 1,639,037 A | * | 8/1927 | Hollingshead | 49/365 |
| 1,869,274 A | * | 7/1932 | Phillips | 49/365 |
| 2,010,625 A | * | 8/1935 | Daste | 296/146.9 |
| 2,438,238 A | * | 3/1948 | Tonkin | 292/182 |
| 2,895,763 A | * | 7/1959 | Wernig | 296/202 |
| 2,997,336 A | * | 8/1961 | Grant et al. | 296/106 |
| 3,051,280 A | * | 8/1962 | Wood et al. | 49/249 |
| 4,399,317 A | * | 8/1983 | Van Dyk, Jr. | 174/364 |
| 4,492,405 A | * | 1/1985 | Chikaraishi et al. | 296/146.9 |
| 5,749,611 A | * | 5/1998 | Watson et al. | 292/336.3 |
| 6,053,565 A | * | 4/2000 | Cho | 296/187.12 |
| 6,332,641 B1 | * | 12/2001 | Okana | 296/146.6 |
| 6,694,676 B2 | * | 2/2004 | Sakamoto et al. | 49/366 |
| 6,848,737 B2 | * | 2/2005 | Mikolai et al. | 296/146.9 |
| 7,008,032 B2 | * | 3/2006 | Chekal et al. | 312/405 |
| 7,059,654 B2 | * | 6/2006 | Ichinose | 296/146.1 |
| 7,258,347 B2 | * | 8/2007 | Keefe et al. | 277/628 |
| 7,845,648 B2 | * | 12/2010 | Keefe et al. | 277/630 |
| 7,905,538 B2 | * | 3/2011 | Ukpai et al. | 296/146.9 |
| 8,002,328 B2 | * | 8/2011 | McKee et al. | 296/146.4 |
| 8,123,278 B1 | * | 2/2012 | McKenney et al. | 296/146.9 |

(Continued)

FOREIGN PATENT DOCUMENTS
JP 57041209 A * 3/1982
(Continued)

*Primary Examiner* — Dennis Penner
*Assistant Examiner* — Paul Chenevert
(74) *Attorney, Agent, or Firm* — Quinn Law Group, PLLC

(57) ABSTRACT

A system controlling an access opening in a body of a vehicle includes a door arranged to selectively open and close a first portion of the opening. A latch is mounted on the door for latching the door to the body and releasing the door to selectively open and close the first portion of the opening. A device is mounted on the door and is configured to be retracted by an actuator before the door is opened and to be protracted by the actuator when the door is closed. A detent is mounted on the device to latch the device to the door when the device is protracted and to release the device before the device is retracted. A motor is mounted on the first door and is configured to operate at least two of the latch, the detent, and the actuator.

18 Claims, 3 Drawing Sheets

U.S. PATENT DOCUMENTS

| | | | |
|---|---|---|---|
| 8,196,992 B2 * | 6/2012 | Konchan et al. | 296/146.9 |
| 2002/0063440 A1 * | 5/2002 | Spurr et al. | 296/146.9 |
| 2006/0249982 A1 * | 11/2006 | Frohne-Brinkmann | 296/146.9 |
| 2010/0156140 A1 * | 6/2010 | Elliott et al. | 296/146.5 |
| 2012/0153678 A1 * | 6/2012 | Konchan et al. | 296/202 |

FOREIGN PATENT DOCUMENTS

JP     05163877 A  *  6/1993

* cited by examiner

US 8,328,268 B2

SYSTEM FOR CONTROLLING AN ACCESS OPENING IN A BODY OF A VEHICLE

TECHNICAL FIELD

The invention relates to a system for controlling an access opening in a body of a vehicle.

BACKGROUND

A typical vehicle has at least one access door. Such a door typically has a latch mechanism for maintaining the door in a latched or closed state until access into or egress from the vehicle is required. The latch mechanism is typically actuated by an outside door handle to gain access to the interior of the vehicle.

Some vehicles employ multiple side doors for access to the vehicle's interior. Commonly, when viewed from the front of the vehicle, such side doors are hinged proximate their front edge. Vehicles with multiple front-hinged side access doors typically employ a structural pillar, often called a B-pillar, on each side of the vehicle. Such pillars are generally situated between the access doors, and are used for mounting door hinges, as well as other various door and body hardware, thereto.

There are also vehicles that have multiple side doors, but do not employ a structural pillar between the doors. Instead, such pillar-less vehicles have a largely open space that is selectively covered and uncovered by the multiple access doors. The pillar-less configuration is often used in vehicles employing a leading access door that is hinged near its front edge, but a trailing access door that is hinged near its rear edge. The absence of a structural pillar in such vehicles, however, removes a location that is typically used for mounting various door and body hardware.

SUMMARY

A system for controlling an access opening in a body of a vehicle includes a door arranged to selectively open and close a first portion of the opening. The system includes a latch mounted on the door for latching the door to the body and releasing the door to selectively open and close the first portion of the opening. The system also includes a device operatively connected to the door and configured to be retracted by an actuator before the door is opened and to be protracted by the actuator when the door is closed for sealing the first portion of the opening. The system additionally includes a detent that is operatively connected to the device for latching the device to the door when the device is protracted and to release the device before the device is retracted. Furthermore, the system includes a motor operatively connected to the first door and configured to operate at least two of i) the latch to release the first door, ii) the detent to release the device from the door, and iii) the actuator to retract the device.

The motor may also be configured to operate the actuator to protract the device. The motor may be additionally configured to coordinate or synchronize the operation of the detent to release the device and the operation of the latch to release the first door. Furthermore, the motor may be adapted to release the detent before releasing the latch.

The system may additionally include a second door arranged to selectively open and close a second portion of the opening that remains open when the at least a first portion of the opening is closed by the first door.

The device may be adapted to seal the first door to the second door when the second door is closed. The device may also be arranged such that it does not retract when the first door is closed and the second door is opened.

Additionally, the second door may include a compliant sealing member, while the device may be adapted to compress the compliant sealing member and seal the opening when the first door and the second door are closed The opening may be an entryway on a side of the vehicle that is characterized by a front end, a rear end, and an absence of a B-pillar. In such a vehicle, the first portion of the opening may be positioned toward the rear end of the vehicle and the second portion of the opening may be positioned toward the front end of the vehicle. Furthermore, wherein the vehicle does not have a B-pillar, the first door is rear-hinged and the second door is front-hinged.

The first door may additionally include a release mechanism configured to manually release the latch when exercised by an operator.

A vehicle employing the above-described system is also disclosed.

The above features and advantages and other features and advantages of the present invention are readily apparent from the following detailed description of the best modes for carrying out the invention when taken in connection with the accompanying drawings.

DETAILED DESCRIPTION

Figure 1:
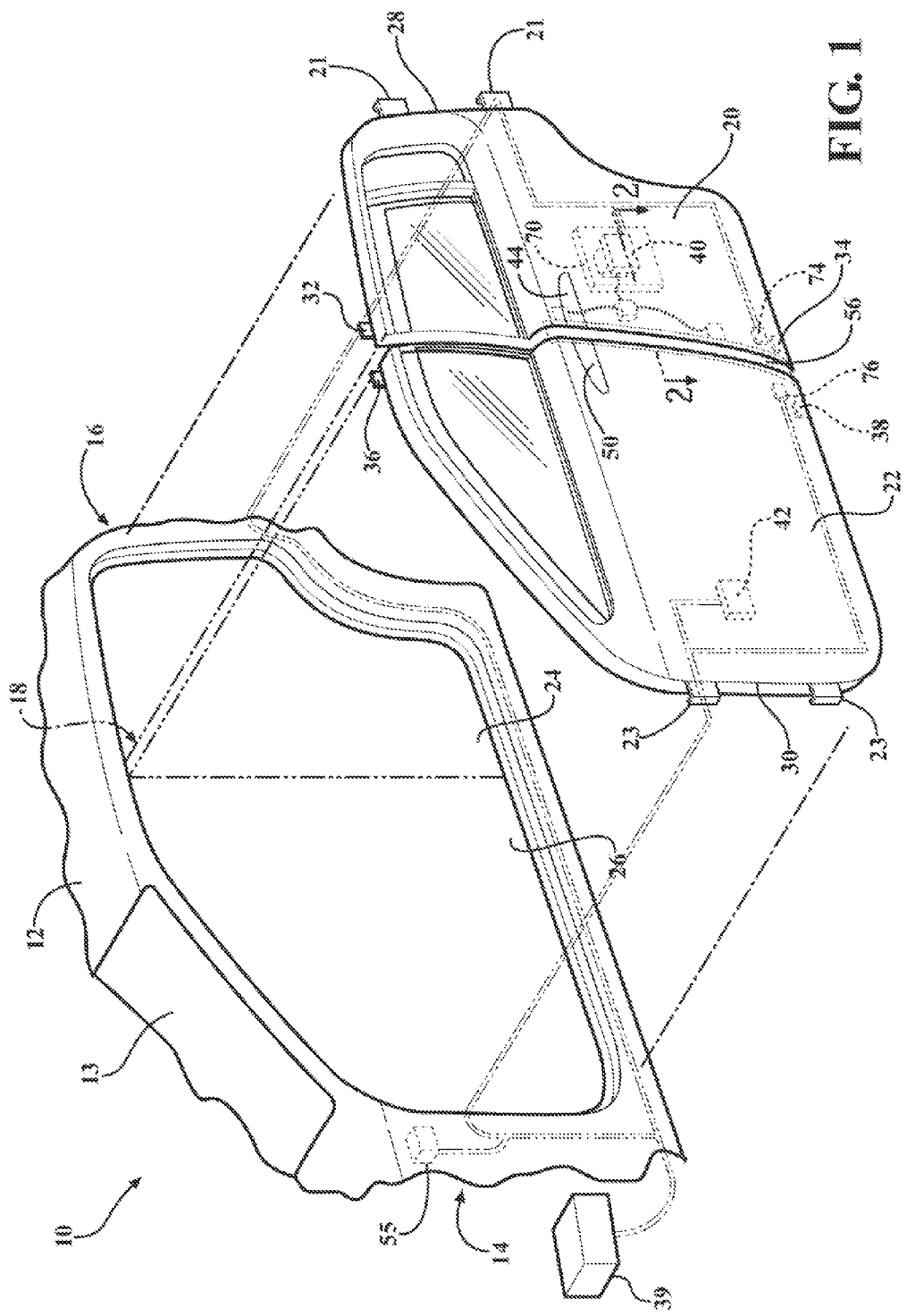
FIG. 1 is a schematic perspective exploded schematic view of a vehicle body illustrating a front-hinged side door and a rear-hinged side door according to an embodiment; both doors are shown in a closed state.

Referring to the drawings, wherein like reference numbers refer to like components, FIG. 1 shows a vehicle body 10. The body 10 includes a body shell 12, as well as openings for windows and various access doors. The body 10 encloses an interior space 13 that is adapted to accommodate vehicle passengers and their belongings. The body 10 includes a front end 14 and a rear end 16 of the vehicle.

An opening 18 is adapted to provide access into the vehicle passenger compartment, i.e., is an entryway arranged on a side of the vehicle, and is configured to be covered by two panels, a first side door 20 and a second side door 22. The first and second doors are "independently" openable and closable, i.e., each of the first and second doors 20, 22 can be opened or closed regardless of the position of the other vehicle door. Although two side doors 20, 22 are shown, a body 10 adapted to employ fewer or greater number of doors is also envisioned. The opening 18 is characterized by an absence of a B-pillar, and is thus termed "continuous". A B-pillar is a structural component that is often employed in bodies of vehicles, and is typically used for mounting miscellaneous door and body hardware, such as door hinges and wiring, and to enhance the structure of the vehicle body. Generally, whether the vehicle employs a B-pillar or not depends on the packaging and the intended use of the vehicle. The presence of a B-pillar, although a structural benefit, may restrict entry into the vehicle. Thus, an absence of a B-pillar is not unusual in vehicles that employ a tightly packaged passenger compartment along with reduced width side doors, such as compact vehicles, and may also be encountered in work vehicles, such as trucks.

The first side door 20 arranged to selectively open and close a first portion 24 of the opening 18, and second side door 22 is arranged to selectively open and close a second portion 26 of the opening 18. As configured, the second portion 26 of the opening 18 is a portion of opening 18 that remains uncovered or open when the first portion 24 is covered by the first door 20. The first portion 24 is positioned toward the rear end 16 of the body 10, and the second portion 26 is positioned toward the front end 14 of the body. The first door 20 is pivotably attached to the body 10 via hinges 21 at its rear or trailing edge 28, while the second door 22 is pivotably attached to the body 10 via hinges 23 at its front or leading edge 30. The first door 20 is termed as being rear-hinged, while the second door 22 is termed as being front-hinged. When opened, the first door 20 swings toward the rear end 16 of the body 10, while the second door 22 swings toward the front end 14, and are, thus, arranged as opposite swinging doors.

The vehicle body 10 additionally includes two sets of latches, a first set of latches 32 and 34, and a second set of latches 36 and 38. The latches 32 and 34 are mounted on the first door 20, and the latches 36 and 38 are mounted on the second door 22. The latches 32 and 34 are arranged to selectively latch the first door 20 to the body 10 when the first door is closed, and release the first door to open the first portion 24 of the opening 18. Similarly, the latches 36 and 38 are arranged to selectively latch the second door 22 to the body 10 when the second door is closed, and release the second door to open the second portion 26 of the opening 18. An electric motor 40 is mounted on the first door 20, while an electric motor 42 is mounted on the second door 22. While the latches 36, 38 are releasable on demand by the electric motor 42, depending on the specific configuration of the electric motor 40, as described in detail below with respect to FIG. 4, the latches 32, 34 may similarly be releasable on demand by the electric motor 40.

The motor 40 is operated via a command received either from a first release lever 44 located on an exterior surface 46 of the first door 20, or via a second release lever (not shown) located on an interior surface 48 of the first door. Similarly, the motor 42 is operated via a command received either from a third release lever 50 located on an exterior surface 52 of the second door 22, or via a fourth release lever (not shown) located on an interior surface 54 of the second door. The motors 40 and 42 are each electrically connected to and receive power from an energy source 39, such as a battery or a generator. The operation of the motors 40 and 42 may be regulated by a controller 55 arranged on the vehicle body 10.

Figure 2:
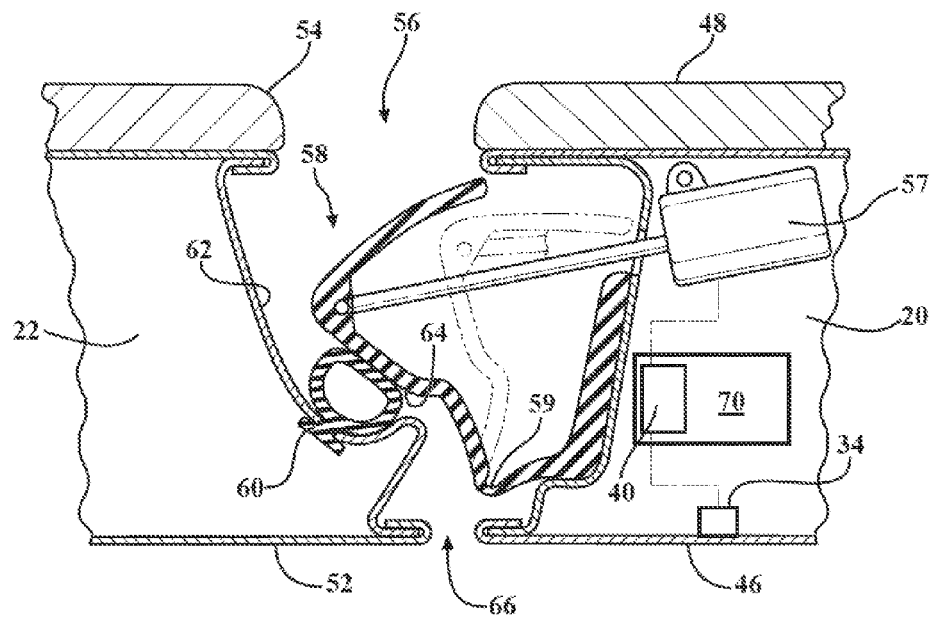
FIG. 2 is a schematic sectional top view of a portion of the side doors taken at line 2-2 of FIG. 1, depicting the side doors in a closed state and a device in a protracted state for sealing the doors.
Figure 3:
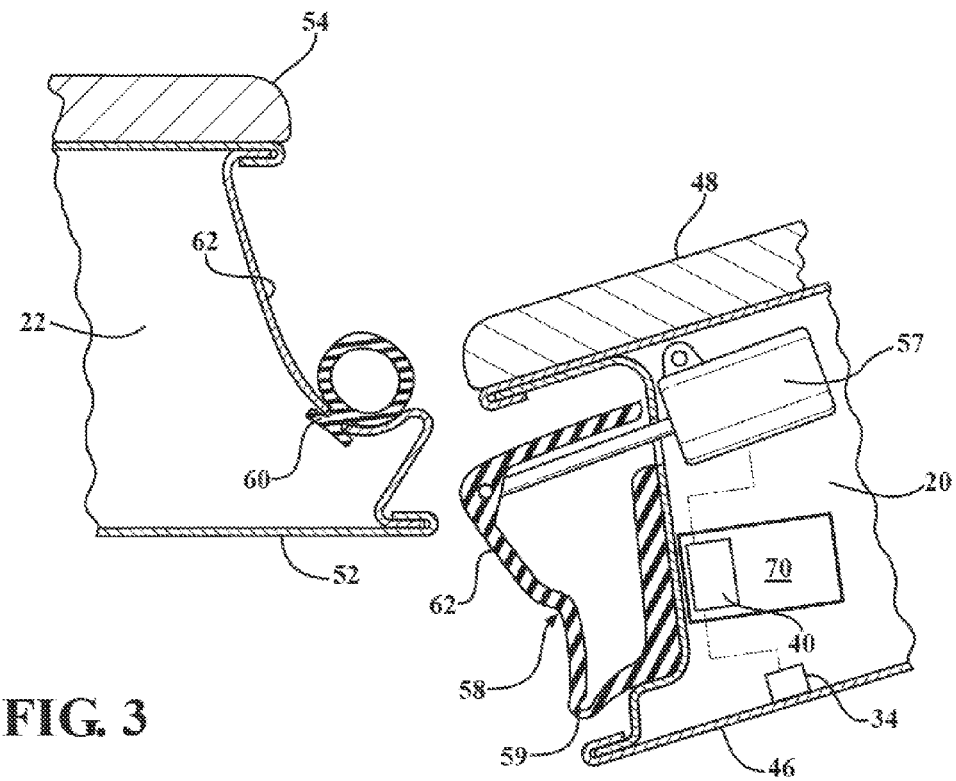
FIG. 3 is a schematic sectional top view of a portion of the side doors shown in FIG. 1, depicting the rear-hinged door in an open state and the front-hinged door in a closed state, and the device in a retracted state.

When the doors 20 and 22 are closed, an opening 56 remains there between, as shown in FIG. 1. FIGS. 2-3 show top view of the vehicle body 10, as seen along a cross section line 2-2 depicted in FIG. 1. As can be seen from FIGS. 2 and 3, a device 58 is mounted on the first door 20, wherein FIG. 2 depicts the first door in the process of being opened while FIG. 3 depicts the first door in the process of being closed. The device 58 is adapted to selectively protract when the first door 20 is closed to cover or fill the opening 56 (as shown in FIG. 2), and to retract before the first door is opened (as shown in FIG. 3). The protraction and retraction of the device 58 is accomplished via an actuator 57, which may be an electromechanical device such as a solenoid. The second door 22 includes a compliant sealing member 60 adapted to be compressed by the device 58 and seal the opening 18 shown in FIG. 1 when the first door 20 and the second door 22 are closed. The sealing member 60 is a weather strip that is mounted to a side surface 62 of the second door 22. A surface 64 of the device 58 is adapted to engage and compress the sealing member 60 for seamless contact therewith when the first and second doors 20, 22 are closed. Thus, with the aid of the sealing member 60, when the device 58 is in its protracted position, the device seals the gap 66 between the first door 20 and the second door 22. The device 58 also fills the opening 56 to protect the interior space 13 from external moisture and dust.

The device 58 includes at least one hinge 59 that is configured to permit the device to protract or retract as necessary. Each hinge 59 may either be configured as a "living" hinge that is formed from the same material and together with the device 58, or as a compound arrangement, as deemed appropriate. The device 58 retracts whenever the first door 20 is opened, and does not retract when the second door 22 is opened while the first door is closed. As shown in FIG. 2, when both the first and the second doors 20, 22 are closed, the first and second doors substantially cover the device 58, leaving but a narrow gap 66 between the exterior surfaces 46 and 52.

Figure 4:
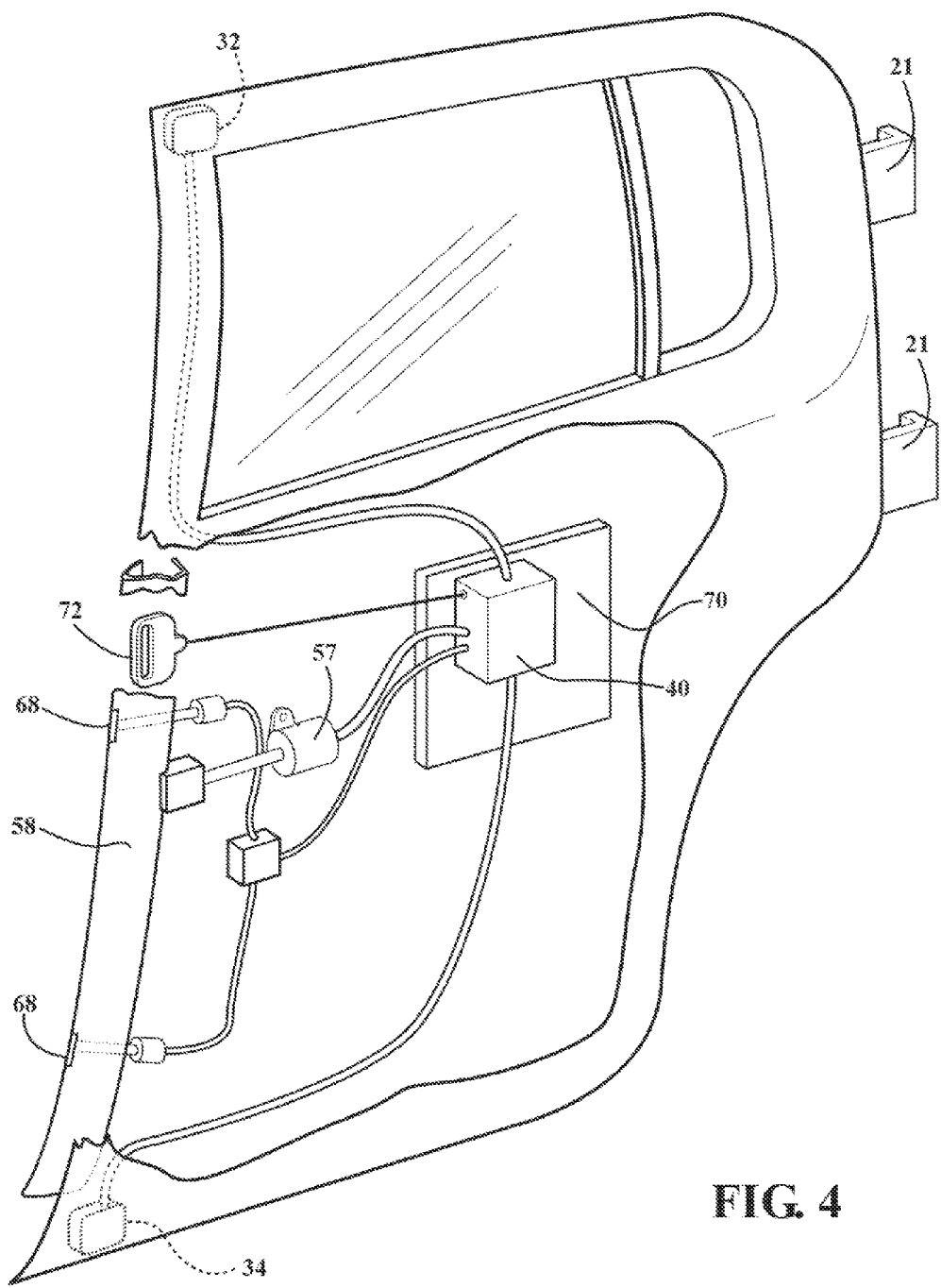
FIG. 4 is a schematic partial cut-away view of the rear-hinged side door employing a retractable device shown in FIG. 1, wherein the door employs a motor for operating latches for the door and a detent for the device.

As shown in FIG. 4, two detents 68 are mounted on the device 58 and are configured to latch or lock the device in the protracted position to the first door 20. The detents 68 are arranged to latch the device 58 to the first door 20 when the device is protracted, and is operable to release the device from the body before the device is retracted. Although two detents 68 are shown, any number of detents may be used to securely latch the device 58 to the first door 20. The electric motor 40 is operatively connected to the first door 20 and to the device 58. The electric motor 40 is configured to operate at least two of i) the latches 32, 34 to release the first door, ii) the detent 68 to release the device 58 from the first door 20, and iii) the actuator 57 to retract the device. Additionally, the electric motor 40 may also be configured to operate the actuator 57 to protract the device 58.

The operation of the motor 40 may be regulated by the controller 55 or via a controller 70 that is adapted for dedicated regulation of the first door 20. Accordingly, the appropriate controller 55 or 70 may be programmed to coordinate the release of the detent 68 and the latches 32, 34, and the retraction of the device 58 via the motor 40. Consequently, the electric motor 40 may be adapted to release the detent 68 either simultaneously with the latches 32 and 34, or to release the detent and the latches sequentially, with the release of the detent taking place before the release of the latches. The electric motor 40 may additionally be adapted to coordinate the release of the latches 32, 34 and the detent 68 with the retraction of the device 58 via the actuator 57. As shown in FIG. 4, a manual release mechanism 72 configured to release the detent 68 may be included on the first door 20. The manual release mechanism 72 is adapted to be actuated by an operator to release the device 58 in the event of a possible malfunction of the detent 68.

Continuous detection of whether each of the first and second doors 20, 22 is open or closed is implemented to facilitate the retraction and protraction of the device 58 at appropriate instances. Referring back to FIG. 1, a sensor 74 is employed to detect the position of the first door 20, while a sensor 76 is employed to detect the position of the second door 22.

Depending on whether the vehicle body 10 is equipped solely with the controller 55 or in addition with the controller 70, sensors 74 and 76 communicate the detected position of the first and second doors 20, 22, respectively, to either the controller 55 or to the controller 70 for appropriate control of the motor 40. The sensors 74 and 76 may have any appropriate configuration to affect the required detection of the position of the first and second doors 20, 22, such as electro-mechanical switches or optical proximity sensors. Additionally, the sensor 74 may be incorporated either into the latch 32 or 34, and the sensor 76 may be incorporated either into the latch 36 or 38.

The device 58 may be mounted on the first door 20 and have the electric motor 40 release the detent 68, as shown in FIGS. 2 and 3. Although not shown, the device 58 may similarly be mounted on the second door 22, and have the release of the appropriate detent coordinated with the release of the latches 36, 38, and have the release of the detent and the latches be coordinated with the protraction and/or retraction of the device by the electric motor 42. In such a case, the device 58 would retract before the second door 22 is opened, and would not retract when the first door 20 is opened while the second door is closed. The device 58 may likewise be employed to seal two opposite swinging doors on a rear end of a vehicle, as occasionally used for access to storage compartments in vans, station wagons, and sport utility vehicles (SUVs).

While the best modes for carrying out the invention have been described in detail, those familiar with the art to which this invention relates will recognize various alternative designs and embodiments for practicing the invention within the scope of the appended claims.

The invention claimed is:

1. A system for controlling an access opening in a body of a vehicle, the system comprising:
   a first door arranged to selectively open and close at least a first portion of the access opening;
   a latch operatively connected to the first door and configured to selectively latch the first door to the body when at least the first portion of the opening is closed and release the first door to open at least the first portion of the opening;
   a device operatively connected to the first door and configured to be retracted by an actuator before the first door is opened and to be protracted by the actuator when the first door is closed to thereby seal at least the first portion of the opening;
   a detent operatively connected to the device, wherein the detent is configured to latch the device to the door when the device is protracted and to release the device from the door before the device is retracted; and
   a motor operatively connected to the first door and configured to operate at least two of i) the latch to release the first door, ii) the detent to release the device from the door, and iii) the actuator to retract the device.

2. The system of claim 1, wherein the motor is additionally configured to operate the actuator to protract the device.

3. The system of claim 1, wherein the first door includes a release mechanism configured to manually release the latch.

4. The system of claim 1, wherein the motor is further configured to coordinate the operation of the detent to release the device and the operation of the latch to release the first door.

5. The system of claim 4, wherein the motor releases the detent before releasing the latch.

6. The system of claim 1, further comprising a second door arranged to selectively open and close a second portion of the opening that remains open when the first door is closed.

7. The system of claim 6, wherein the device is adapted to seal the first door to the second door when the second door is closed.

8. The system of claim 7, wherein the device does not retract when the first door is closed and the second door is opened.

9. The system of claim 7, wherein the vehicle body is characterized by a front end, a rear end, and an absence of a B-pillar, and wherein:
   the opening is an entryway on a side of the vehicle;
   the first portion of the opening is positioned toward the rear end of the vehicle and the second portion of the opening is positioned toward the front end of the vehicle;
   the first door is rear-hinged; and
   the second door is front-hinged.

10. A vehicle comprising:
    a body having a front end and a rear end, and defining an access opening; and
    a system for sealing the opening having:
       a first door arranged to selectively open and close at least a first portion of the opening;
       a latch mounted on the first door and arranged to selectively latch the first door to the body when at least the first portion of the opening is closed and release the first door to open at least the first portion of the opening;
       a device operatively connected to the first door and configured to be refracted by an actuator before the first door is opened and to be protracted by the actuator when the first door is closed to thereby seal at least the first portion of the opening;
       a detent mounted on the device, the detent arranged to latch the device to the door when the device is protracted and operable to release the device from the door before the device is retracted; and
       a motor operatively connected to the first door and configured to operate at least two of i) the latch to release the first door, ii) the detent to release the device from the door, and iii) the actuator to retract the device.

11. The vehicle of claim 10, wherein the motor is additionally configured to operate the actuator to protract the device.

12. The system of claim 10, wherein the first door includes a release mechanism configured to manually release the latch.

13. The vehicle of claim 10, wherein the motor is further adapted to coordinate the operation of the detent to release the device and the operation of the latch to release the first door.

14. The vehicle of claim 13, wherein the motor releases the detent before releasing the latch.

15. The vehicle of claim 10, further comprising a second door arranged to selectively open and close a second portion of the opening that remains open when the first door is closed.

16. The vehicle of claim 15, wherein the device is adapted to seal the first door to the second door when the second door is closed.

17. The vehicle of claim 16, wherein the device does not retract when the first door is closed and the second door is opened.

18. The vehicle of claim 16, wherein the vehicle body is characterized by an absence of a B-pillar, and wherein:
    the access opening is an entryway on a side of the vehicle;
    the first portion of the opening is positioned toward the rear end of the vehicle and the second portion of the opening is positioned toward the front end of the vehicle;
    the first door is rear-hinged; and
    the second door is front-hinged.

* * * * *